United States Patent [19]

Suellentrop

[11] Patent Number: 4,793,607
[45] Date of Patent: Dec. 27, 1988

[54] REINFORCED PLASTIC SWING SEAT AND METHOD OF MOLDING

[75] Inventor: Steven M. Suellentrop, Imperial, Mo.

[73] Assignee: Lemay Machine Company, St. Louis, Mo.

[21] Appl. No.: 862,964

[22] Filed: May 14, 1986

[51] Int. Cl.$^4$ ............................................. A63G 9/00
[52] U.S. Cl. ................................... 272/85; 297/273; 297/DIG. 2
[58] Field of Search ....................... 272/85, 86, 87, 88, 272/89, 90, 91, 92; 297/DIG. 2, 273; 264/254

[56] References Cited

U.S. PATENT DOCUMENTS

| | | | |
|---|---|---|---|
| 1,975,405 | 10/1934 | Pryale | 297/DIG. 2 |
| 2,225,737 | 10/1940 | De Vaney | 272/85 |
| 2,444,618 | 7/1948 | Seamster | 272/85 |
| 2,558,389 | 7/1951 | Robinson | 297/DIG. 2 |
| 3,261,607 | 7/1966 | Horowitz et al. | 272/85 |
| 3,897,056 | 7/1975 | Hock et al. | 272/85 |
| 4,066,258 | 1/1978 | Yates | 272/85 |
| 4,296,923 | 10/1981 | Ahrens | 272/85 |
| 4,524,966 | 6/1985 | Shannon et al. | 272/85 |
| 4,575,073 | 3/1986 | Thacker | 297/DIG. 2 |

Primary Examiner—Robert A. Hafer
Assistant Examiner—Samuel Rimell
Attorney, Agent, or Firm—Jerome A. Gross

[57] ABSTRACT

A molded plastic swing seat has a pair of fully encapsulated thin flexible steel straps. To maintain the straps from warping or buckling under the forces exerted by inflow into the shallow mold of plastic material under high pressure, the straps are retained flat in a plane by the tips of closely spaced pairs of pins. Molding pressure forces a film of plastic material in the clearance beneath each tip, leaving the straps protected against corrosion. Since the embedded straps spread the force applied by ejection pins, the molded part may be ejected from the mold without waiting for it to harden, thus increasing production capacity.

6 Claims, 2 Drawing Sheets

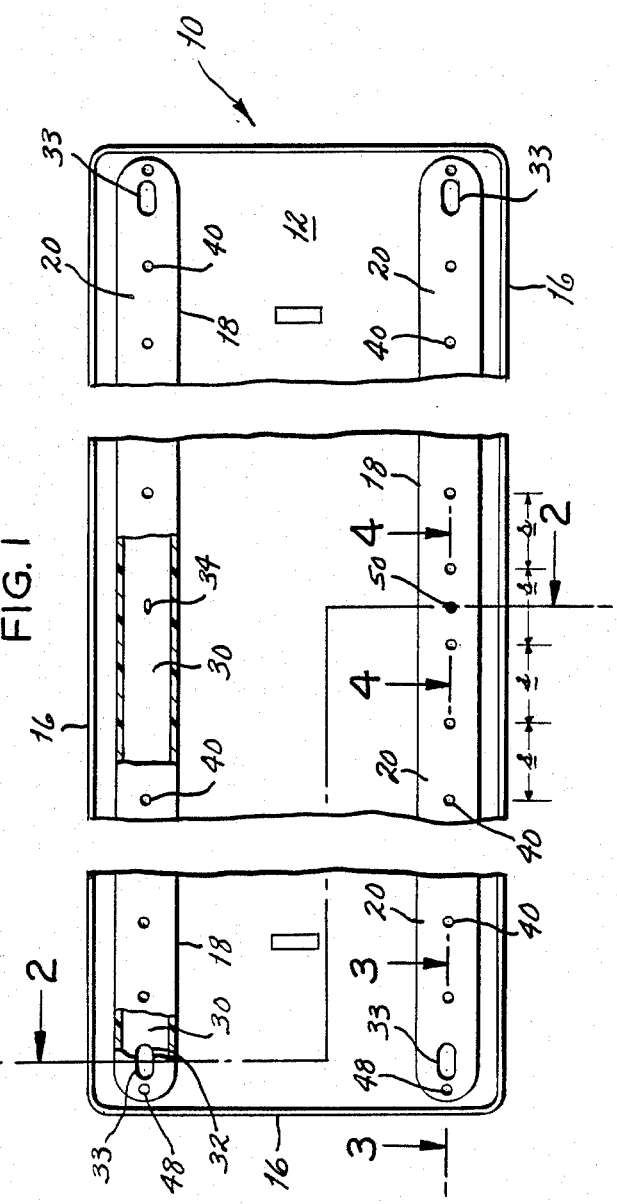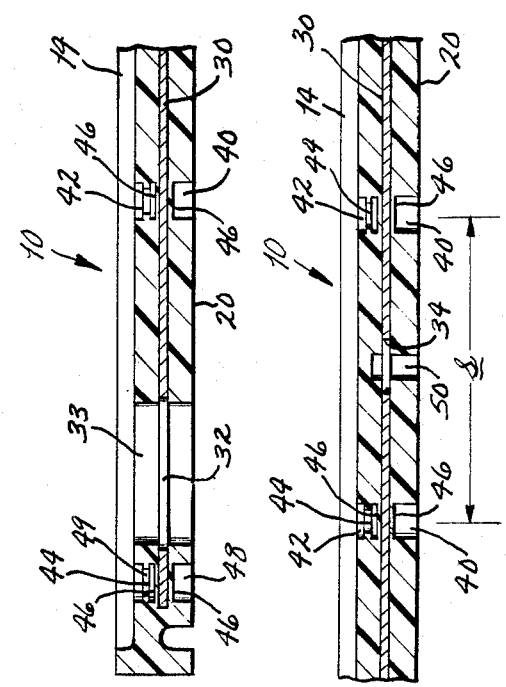

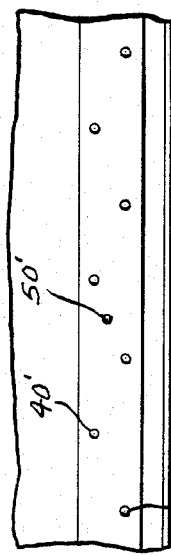
FIG. 5
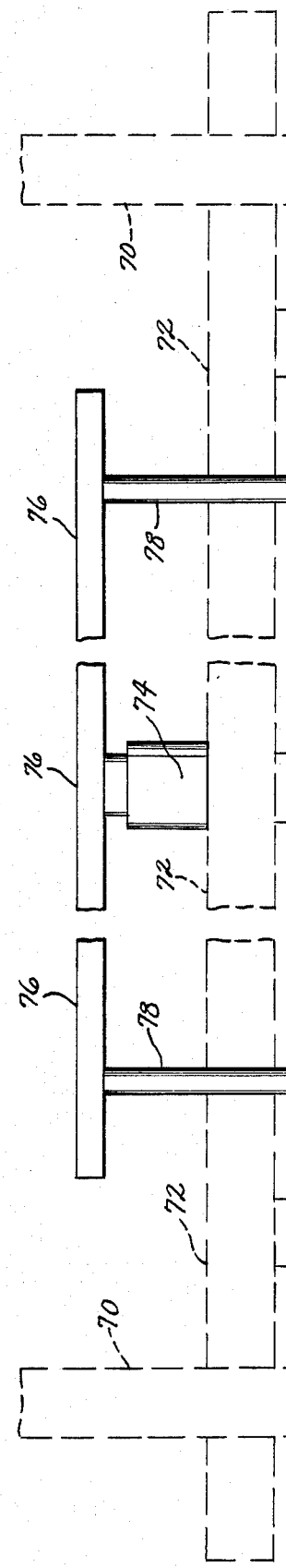
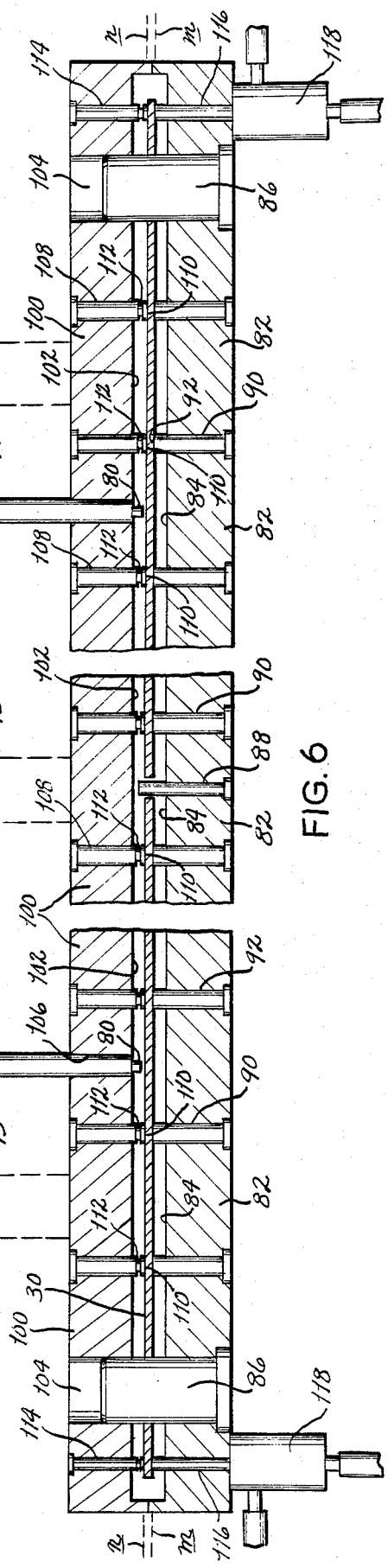
FIG. 6

REINFORCED PLASTIC SWING SEAT AND METHOD OF MOLDING

BACKGROUND OF THE INVENTION

This invention deals with slender injection-molded plastic articles of the type having highly flexible internal steel strap reinforcements, and has particular application to playground swing seats which ay bend elastically through a 180° arc.

An injection-molded swing seat having separate steel strap reinforcements is shown in U.S. Pat. No. 3,897,056. In it, the undersurface of the seat is molded to provide an elongated flat framed area just inward of the front edge, and a similar framed area just inward of the rear edge. These framed areas are crossed at intervals by molded ties or "keepers" which generally resemble belt loops. After molding the plastic article, steel straps are slid lengthwise beneath the molded ties and seated in the framed areas. At each of its ends, the steel straps have attachment apertures, which register with attachment apertures in the molded seat.

In that construction the straps are left exposed, so that they might rust if no protective coating was provided. Of greater concern is the possibility that the molded ties which hold the strap may break as when the seat is twisted or subjected to other misuse.

Persons familiar with the problems of injection molding will recognize the difficulty of fully encapsulating a flexible strap in a slender flexible article such as a swing seat. It is a familiar practice to use a minimum number of locator pins to substantially clamp relatively rigid steel inserts in position in the molds. In such case the pins rigidly prevent displacing of the insert by the inflow of plastic material. The present situation is quite different. The problem is not merely to retain the insert, but to prevent it from bending, as in a sine wave, or buckling or being otherwise distorted; while nevertheless permitting the inflow beneath the pin tips of enough plastic to form a continuing film over the insert, preserving it from corrosion.

Instead of flat strap,, steel cables, plated to prevent corrosion, have been molded in slender swing seats.

SUMMARY OF THE INVENTION

The principal purpose of the present invention is to provide an injection-molded plastic swing seat so slender that it bends readily through an arc of 180°; as well as one reinforced with thin metal straps which are completely and evenly encapsulated in the seat. More broadly, an object of the invention is to provide a method of injection molding of slender plastic articles having flexing reinforcing straps whose width is several times as great as the total thickness of the molded article, without buckling or bending the strap out of planarity under the force exerted by the injected material. An additional purpose is to shorten the time between injection and ejection of the molded part.

A swing seat made according to the present invention has a pair of flexible metal straps spaced apart in the same plane; each strap having an attachment aperture adjacent to its ends. The straps are fully encapsulated in an injection-molded seat panel whose total thickness is substantially less than the width of the straps, and may be less than one-third the strap width. Along both surfaces of the seat body, between its end attachment apertures which extend through the straps are relatively closely spaced pits, molded along the length of the straps and extending inward; the bottoms of these pits have films of plastic material presented against the surfaces of the straps.

The invention also includes the method of molding the slender plastic article in a two-part injection mold, in which planar alignment of the flexible metal straps is undisturbed by the inflow of plastic material into the slender mold cavity. For this purpose, a first mold half has a projecting plurality of relatively closely spaced alignment pins whose tips provide a plane along which the strap may rest. A registering set of somewhat different alignment pins extend from the mold surface of the opposite mold half, so that when the two mold halves are closed, the tips of the opposed pins confine the strap. However, contrary to usual molding practice, the pin tips do not clamp the strap. They provide clearance of at least 0.002", preferably between 0.003" and 0.005" on each side. These opposed, closely spaced alignment pins provide the pits above referred to; the clearance along the strap beneath their tips provides space for entry of plastic to form a film at the bottom of the pits when the mold is closed and the plastic injected.

The difference between the two sets of alignment pins is this: at least part of those of the second plurality have a provision for preliminarily retaining the molded plastic article as the mold halves separate, preferably a simple neck groove or "keeper."

A unique advantage of the present invention is ejection of the molded part a shortened time interval after the hot molten plastic material has been forced into the mold. The ejection procedure is as follows: The first mold cavity, bearing strap support pins, is separated from the molded article. As the strap support pins withdraw, the molded article is retained t the second cavity surface by the keeper grooves in the alignment pins, extending from that surface. Thus, numerous spaced apart ejection pins whose tips are tapered or of small diameter, are driven out to apply their forces, distributed by the steel straps, to eject the molded article without waiting for it to harden.

The straps distribute the ejection forces along their lengths, dislodging the molded article from the keepers of the second set of alignment pins. If the straps were not present, the still soft plastic article might be punctured, or at least seriously deformed. This procedure permits recycling of the injection molding system much more rapidly than if it were necessary to wait for the molded article to harden before being ejected.

BRIEF DESCRIPTION OF THE DRAWINGS

FIG. 1 is a bottom plan view, partly broken away, of an injection-molded plastic swing seat embodying the present invention FIG. 2 is an enlarged cross-section taken along the broken line 2—2 of FIG. 1.

FIG. 3 is a further enlarged cross-sectional view taken along line 3—3 of FIG. 1.

FIG. 4 is a view similar to FIG. 3 taken along line 4—4 of FIG. 1.

FIG. 5 is a view similar to the central portion of FIG. 1, illustrating the modified lower surface seat portion resulting where the strap alignment pins have been arranged staggered in lines spaced apart from the centerline of the steel strap.

FIG. 6 is a cross-sectional view, schematic, of an injection mold system used in the present process of molding the swing seat illustrated in the other figures.

DESCRIPTION OF THE PREFERRED EMBODIMENT

The reinforced plastic swing seat shown in the drawings is the preferred embodiment of the present invention. It is formed of flexible, almost rubber-like ethylene vinyl acetate or other plastic having generally similar physical properties and being capable of being injection molded. Injection molding is carried out in a conventional injection mold press, at a plastic temperature in the range of approximately 400° F. The press may operate at roughly 1,000 psi, with the cavity pressure estimated as up to 10 times as great. Yet, the inflow of plastic into the shallow cavity does not disturb the position of the broad flexible metal straps; they remain parallel to the surfaces between which they are evenly embedded.

Referring to the drawings, the molded plastic swing seat generally designated 10 comprises a relatively slender rectangular body portion 12 strengthened by an upper rim 14 and a lower rim 16. A pair of broad flat ribs 18 project from the lower surface of the body portion. As seen in FIG. 1, the ribs 18 are parallel to and spaced apart from each other; they extend substantially the entire length of the body portion 12, and are of such thickness that their lower surfaces 20 project downward preferably by the same extent as the lower rim 16. In the claims the term "the thickness of the body" is to be understood as its thickness at the ribs. Such thickness must be minimized if the plastic article is to flex readily, cool quickly, and be economically manufactured. This makes it critical to stabilize the flat metal strap inserts so that they remain flat and precisely spaced between the surfaces of the shallow part. This problem and its present solution are described hereinafter.

Enclosed within the body portion 12 and encompassed by its flat ribs 18, are a pair of flexible metal straps 30, preferably having a substantial degree of springiness and capable of repeated flexure through a 180° arc without permanent deformation or "set." For the specific article shown, whose total thickness in the region of the ribs 18 is only 0.195", and the rib width is 13/16", the straps have a width of ⅝" and a thickness of 0.025".

This rib width is sufficiently greater than the width of the straps 30 to distribute concentrated loads from the sides of the straps when the seat is twisted or otherwise misused. Each of the straps has attachment apertures 32 adjacent to and spaced inwardly of each of its ends, as shown in FIG. 1. The seat itself has apertures 33 through its body 12 and ribs 18 coinciding or in registration with the strap apertures 32. Spaced midway between the strap attachment apertures 32, and in linear alignment therewith, the strap has a central retaining aperture 34, which is preferably slightly elongated as shown in FIGS. 1 and 4.

As seen in FIGS. 1 and 4, aligned from each other along the rib lower surfaces 20 at a spacing s, and extending inward toward the straps 30 between its attachment apertures 32, are lower surface pits 40. Likewise, molded in the upper surface of the seat body, preferably to form registering pairs with the lower surface pits 40, are upper surface pits 42, differing from the lower surface pits 40 in that each upper surface pit 42 has an annular inward extending projection 44, which serves to retain the molded part pending final ejection as hereinafter described. Both lower and upper pits 40, 42 have thin plastic films 46 at their pit bottoms. Similar bottom films 46 are provided in outboard lower pits 48 and upper pits 49, the latter also having annular inward projections 44.

Referring to FIG. 4, a small, preferably cylindrical cavity 50 is formed inward from each rib lower surface 20 at the midpoint of each strap 30. The diameter of the cylindrical cavity 50 equals the horizontal width of the lengthwise elongated strap aperture 34; see the broken cross-sectional view FIG. 2. While the cavities 50 extend inward from the rib surfaces 20 beyond the straps 30, they preferably do not extend through the upper surface of the seat body portion 12.

The principal problem, in molding the shallow article described, is how to maintain the flatness of the straps 30 and their parallelism with the rib lower surfaces 20 and upper surfaces of the body 12 under the tremendous forces accompanying the injection of the plastic material. Plastic material will be introduced into the mold cavity, at points chosen by the mold designer. The plastic flows under great pressure, which may be of the order of 10,000 psi and is driven outward, past both the upper and under surfaces of the straps 30, to fill the mold cavity as quickly as possible. Since the plastic cannot reach all portions of both surfaces of each strap at the same time, the straps tend to bend or buckle under the inflow of the plastic. There must be adequate means to preserve their alignment and planarity; yet to enclose all areas of the strap with at least a film of plastic, there can be no rigid clamping of the straps.

To illustrate the present process, a molding apparatus is shown schematically in FIG. 6. No attempt is made to illustrate the complex construction of conventional high production injection molding apparatus. The illustration of FIG. 6 shows, at bottom, a first mold cavity half 82; and in phantom line, press opening guides 70 on which reciprocates a press opening plate 72 which is opened and closed by conventional means, not shown. Its projecting bars 73 support a second mold cavity half 100. The opening plate 72 also carries an ejection cylinder 74, driving a bridge 76 which extends substantially the entire length of the mold. From the bridge 76 a plurality of spaced ejection pins 78 extend through the second mold cavity half 100 and substantially perpendicular to its mold surface 102.

The mold surface 84 of the first cavity half 82 is recessed to provide the ribs 18 on the undersurface of the seat 10. The schematic cross-section through the mold, FIG. 6, shows the cavity along a section line corresponding to the partial sections FIGS. 3 and 4.

Projecting from the first mold cavity surface 84 near each of its ends is a strap support pin 86 conformed to fit similarly within a strap attachment aperture 32. As shown, it extends into an aligned elongated bore 104 in the second mold cavity half 100. Substantially midway between the support pins 86, there extends from the first mold cavity surface 84 a retaining pin 88, of such diameter and length as to form the cavity 50 seen in FIGS. 2 and 4, that is, to fit securely within the width of the strap retaining aperture 34 shown in FIG. 1. As seen in FIG. 6, the retaining pin 88 extends well past the midpoint of depth of the cavity between its first and second cavity surfaces 84, 102.

In order to mold the lower surface pits 40, I provide along the first mold cavity surface 84 a plurality of alignment pins 90, whose tips 92 lie in a first plane m. Similarly projecting from the second mold cavity surface 102 is a corresponding plurality of alignment pins 108 whose tips 110 lie in a second plane n. The ejection pins 78 preferably have shouldered small-diameter tips 80 which may also extend as far as this plane n. The spacing of the planes m, n from each other corresponds to the thickness of a strap 30 plus some positive clearance, say, 0.002" or 0.005" on each side of the strap. Each of the second cavity surface alignment pins 108 have necked or grooved "keeper" portions 112 adjacent to the pin tips 110.

On the second mold cavity surface 102, outboard of each of the elongated bores 104 which receive the strap support pins 86 when the mold halves are closed, are outboard alignment pins 114, formed similarly to the alignment pins 108 and with their tips lying in the plane n. Opposite them are stripper pins 116, each of which may be projected beyond the tip plane m by an air cylinder 118 to aid in stripping from the adjacent strap support pins 86. High production molds will be of greater complexity than the embodiment here described; however, the differences lie within the range of skill of designers in the field.

In use, with the mold cavity halves 82, 100 separated from the FIG. 6 position, a pair of straps 30 are placed on the strap support pins 86, supported by their end attachment apertures 32, and the strap retaining apertures 34 are engaged on the retaining pins 88. Each strap is thus brought into alignment with the tips 92 of the first mold half alignment pins 90, so that it rests in the plane m. The mold halves 82, 100 are then closed against each other, bringing the support pins 86 within the elongated bores 104 of the second cavity half 100 and presenting its alignment pin tips 110 in the second plane n. The small clearance along the strap sides results in forming a thin film of plastic at the bottoms of the pits formed by the alignment pin tips 92, 110.

The plastic material is then injected under great pressure, ordinarily conducted to flow outward from ports, not shown in the cross-section of FIG. 6, inwardly closer to a longitudinal centerline of the seat 10. The rapid outflow of plastic under high pressure makes uneven contact with the strap surfaces; this would cause the midportions of long straps to deflect outward of the alignment shown in FIG. 1 were it not for the central retaining pins 88. Regardless of relative length, the straps would nevertheless tend to bend or warp out of the planarity were it not for the adjacency to the strap surfaces, during plastic inflow of the alignment pin tips 92, 110, which, with a film of plastic therebetween, effectively confine the straps. For effective confinement, the pairs of pins 90, 108 are at a fairly close spacing s preferably no greater than 120 times the strap thickness and in the illustrated embodiment at substantially 80 times the strap thickness. This relatively close spacing makes it unnecessary to clamp the strap between opposed pins, as would be conventional; instead, clearance of as small as 0.002" on each side of the strap permits flow of plastic material between the strap sides and the pin tips. Further, the plastic appears to inflow beneath the pin tips adequately on both sides of the strap, without starving either side.

An alternate arrangement of alignment pins, to provide further assurance against out-of-plane bending of the straps 30, is shown in the fragmentary view, FIG. 5, of a portion of undersurface of a similar plastic molded seat which corresponds generally to the lower midportion of FIG. 1. A central cavity 50', which like pit 50 is at midpoint of the width of an embedded strap, is flanked by undersurface pits 40' staggered from each other along lines on both sides of the central line of the strap. This staggered arrangement of lower surface pits 40' and a corresponding arrangement of staggered pits in the upper surface of the part, is achieved by staggering alignment pins similar to the pins 90, 108. In particular usages, this alternate arrangement may be found to be advantageous.

Shortly after the plastic has been injected into the mold cavity as shown in FIG. 6, the second mold half 100 is withdrawn by the press opening plate 72; at the same time the outboard stripper pins 116 are energized to drive the straps 30 from their support pins 86; the retaining pin 88 is simultaneously disengaged from the strap. Meantime, the keeper grooves or necked portions 112 on the second mold half alignment pins 108 support the still hot, not fully solidified molded part. Then, the ejection cylinder 74 is actuated to drive the small shouldered tips 80 of the ejection pins 78 against the thin plastic between them and the broad surfaces of the straps 30. In this ejection operation the straps function to spread the ejection forces substantially evenly throughout their length. The ejecting tips 80 do not puncture or seriously deform the soft plastic material, as would result if similar ejection forces were applied against an unsolidified plastic article without such strap reinforcement. By having the smaller diameter tip portions of these shouldered ejection tips 80 presented close to the strap 30 during molding, ejecting does not materially deform even the molded surfaces immediately adjacent to the points of ejection. The straps thus serve not merely as reinforcements, but also the valuable process purpose of permitting ejection of the part within a very short time after injection of the molding material; so the press may be recycled with a substantial increase in its productive capacity.

I claim:

1. A plastic swing seat reinforced by internal metal straps comprising
    A. A pair of flexible metal straps positioned parallel to each other and spaced apart in the same plane, each having an attachment aperture adjacent to and spaced inwardly of each of its ends, and
    B. A panel-like flexible plastic seat body completely surrounding and encompassing the upper, lower and outer edge surfaces of said straps, the thickness of the body being less than half the width of the straps, there being apertures through the seat body coinciding with said attachment apertures of the straps, the seat body further having
        a plurality of pits extending perpendicularly inward into the upper and lower seat surfaces, spaced from each other along the length of said straps and extending inward toward said straps and terminating in pit bottoms comprising films of plastic material adjacent to the side surfaces of the straps,
        whereby the straps are substantially sealed from rusting.

2. A swing seat as defined in claim 1, wherein the said molded pits, which so extend into the upper and lower seat body surfaces, are in registering pairs, at a spacing no greater than 120 times the thickness of the straps.

3. A swing seat as defined in claim 1, in which
    each strap further has a retaining aperture aligned between its end apertures, and in which the seat body has a cavity extending from the upper or lower surface into said strap retaining aperture.

4. A swing seat as defined in claim 1, together with additional registering pairs of pits positioned outboard of the strap attachment apertures but inward of the strap ends.

5. A swing seat as defined in claim 1, wherein the pacing from each other of said registering pairs of molded its is preferably substantially 80 times the strap thickness.

6. The reinforced plastic article defined in claim 1, in which said molded pits are in linear alignment with said strap attachment apertures.

* * * * *

UNITED STATES PATENT AND TRADEMARK OFFICE
CERTIFICATE OF CORRECTION

PATENT NO. : 4,793,607
DATED : December 27, 1988
INVENTOR(S) : Steven M. Suellentrop It is certified that error appears in the above-identified patent and that said Letters Patent is hereby corrected as shown below:

Col. 1, line 9, delete "ay" and substitute ---may---.

Col. 1, line 43, delete "strap," and substitute ---straps---.

Col. 2, line 35, delete "t" and substitute ---to---.

Col. 7, line 6, delete "pacing" and substitute ---spacing---.

Col. 8, line 1, delete "its" and substitute ---pits---.

Signed and Sealed this

Twenty-fifth Day of April, 1989

Attest:

DONALD J. QUIGG

Attesting Officer

Commissioner of Patents and Trademarks